(12) United States Patent
Ma et al.

(10) Patent No.: US 11,085,574 B2
(45) Date of Patent: Aug. 10, 2021

(54) HANDHELD GIMBAL AND HANDHELD STRUCTURE

(71) Applicant: SZ DJI OSMO TECHNOLOGY CO., LTD., Shenzhen (CN)

(72) Inventors: Tianhang Ma, Shenzhen (CN); Yanchong Zhao, Shenzhen (CN); Xifeng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 243 days.

(21) Appl. No.: 16/163,932

(22) Filed: Oct. 18, 2018

(65) Prior Publication Data

US 2019/0049060 A1 Feb. 14, 2019

Related U.S. Application Data

(63) Continuation of application No. PCT/CN2016/093275, filed on Aug. 4, 2016.

(51) Int. Cl.
| | |
|---|---|
| *F16M 11/04* | (2006.01) |
| *F16M 11/12* | (2006.01) |
| *F16M 13/04* | (2006.01) |
| *F16M 11/20* | (2006.01) |
| *F16M 11/18* | (2006.01) |
| *F16M 11/08* | (2006.01) |
| *F16M 13/00* | (2006.01) |

(Continued)

(52) U.S. Cl.
CPC .......... *F16M 11/041* (2013.01); *F16M 11/08* (2013.01); *F16M 11/12* (2013.01); *F16M 11/123* (2013.01); *F16M 11/16* (2013.01); *F16M 11/18* (2013.01); *F16M 11/2057* (2013.01); *F16M 13/00* (2013.01); *F16M 13/04* (2013.01); *G03B 17/561* (2013.01); *G03B 17/563* (2013.01); *F16M 2200/041* (2013.01); *F16M 2200/044* (2013.01)

(58) Field of Classification Search
CPC combination set(s) only.
See application file for complete search history.

(56) References Cited

U.S. PATENT DOCUMENTS

| | | | |
|---|---|---|---|
| 3,436,090 A * | 4/1969 | Roderick | A63C 11/222 280/821 |
| 6,264,242 B1 * | 7/2001 | Lenhart | A45B 9/02 280/821 |

(Continued)

FOREIGN PATENT DOCUMENTS

| | | |
|---|---|---|
| CN | 101922599 A | 12/2010 |
| CN | 202502338 U | 10/2012 |

(Continued)

OTHER PUBLICATIONS

World Intellectual Property Organization (WIPO) International Search Report for PCT/CN2016/093275 dated May 3, 2017 8 Pages.

*Primary Examiner* — Monica E Millner
(74) *Attorney, Agent, or Firm* — Anova Law Group, PLLC

(57) ABSTRACT

A handheld gimbal includes a handheld structure and a gimbal body operably coupled with the handheld structure. The handheld structure includes a handheld body having at least one functional button, and a gripping structure extending from a bottom portion of the handheld body away from the handheld body. The gimbal body is operably coupled with a side of the handheld body.

22 Claims, 12 Drawing Sheets

(51) Int. Cl.
*G03B 17/56* (2021.01)
*F16M 11/16* (2006.01)

(56) References Cited

U.S. PATENT DOCUMENTS

| | | | | |
|---|---|---|---|---|
| 6,386,588 | B1* | 5/2002 | Young | A44B 11/12 |
| | | | | 280/821 |
| 8,328,359 | B2 | 12/2012 | Monroe et al. | |
| 9,027,206 | B2* | 5/2015 | Guyoton | A63C 11/222 |
| | | | | 16/430 |
| 9,458,963 | B1* | 10/2016 | Choi | F16M 11/041 |
| 9,791,767 | B2* | 10/2017 | Ye | B64D 47/08 |
| 9,800,786 | B1* | 10/2017 | Wei | H04N 5/2328 |
| 9,851,046 | B2* | 12/2017 | Pan | F16M 11/18 |
| 10,642,130 | B2* | 5/2020 | Niemeyer | G03B 17/561 |
| 2007/0050139 | A1* | 3/2007 | Sidman | G03B 17/561 |
| | | | | 318/649 |
| 2009/0257741 | A1* | 10/2009 | Greb | F16M 13/04 |
| | | | | 396/55 |
| 2015/0071627 | A1* | 3/2015 | Hoang | F16M 11/10 |
| | | | | 396/421 |
| 2015/0076297 | A1 | 3/2015 | Parrill | |
| 2015/0261070 | A1* | 9/2015 | Feng | G03B 17/561 |
| | | | | 396/421 |
| 2016/0352992 | A1* | 12/2016 | Saika | F16M 11/121 |
| 2016/0381271 | A1* | 12/2016 | Cheng | F16M 11/18 |
| | | | | 348/208.2 |
| 2017/0089513 | A1* | 3/2017 | Pan | G03B 15/006 |
| 2017/0227162 | A1* | 8/2017 | Saika | B64D 47/08 |
| 2017/0307136 | A1* | 10/2017 | Wei | F16M 13/04 |
| 2018/0187824 | A1* | 7/2018 | Yan | F16M 11/16 |
| 2018/0194488 | A1* | 7/2018 | Zhao | G03B 15/006 |

FOREIGN PATENT DOCUMENTS

| | | |
|---|---|---|
| CN | 203726501 U | 7/2014 |
| CN | 204131587 U | 1/2015 |
| CN | 204256529 U | 4/2015 |
| CN | 204420520 U | 6/2015 |
| CN | 204986263 U | 1/2016 |
| CN | 105736925 A | 7/2016 |
| CN | 205896649 U | 1/2017 |
| CN | 205979046 U | 2/2017 |
| DE | 202015001540 U1 | 7/2015 |

\* cited by examiner

US 11,085,574 B2

HANDHELD GIMBAL AND HANDHELD STRUCTURE

CROSS-REFERENCE TO RELATED APPLICATION

This application is a continuation application of International Application No. PCT/CN2016/093275, filed on Aug. 4, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of gimbals and, more particularly, to a handheld gimbal and a handheld structure.

BACKGROUND

Handheld gimbals can be used with various portable imaging devices. Handheld gimbals have been widely used in television, movie, reality show, sports photography, aerial photography, safety surveillance, etc. A handheld gimbal typically includes three axes: a yaw-axis, a roll-axis, and a pitch-axis. Motion of the handheld gimbal around each axis may be controlled by an electric motor. A user may operate the gimbal to rotate around the three axes, and to move the gimbal in a direction opposite a trend of the motion, thereby allowing the gimbal to be relatively stationary in a three-dimensional space, which improves the stability of the imaging devices.

In the present market, a handheld gimbal for single hand use typically includes a simple handle structure. The gimbal may be mounted on top of the handle structure, or at the front side of the handle structure. The volume of the handheld gimbal may be large. When the handle structure carries a cell phone gimbal or a camera gimbal that has a large volume, the combination appears to be top-heavy.

SUMMARY

In accordance with the present disclosure, there is provided a handheld gimbal. The handheld gimbal includes a handheld structure and a gimbal body operably coupled with the handheld structure. The handheld structure includes a handheld body having at least one functional button, and a gripping structure extending from a bottom portion of the handheld body away from the handheld body. The gimbal body is operably coupled with a side of the handheld body.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LISTING OF MAJOR ELEMENTS

Figure 1:
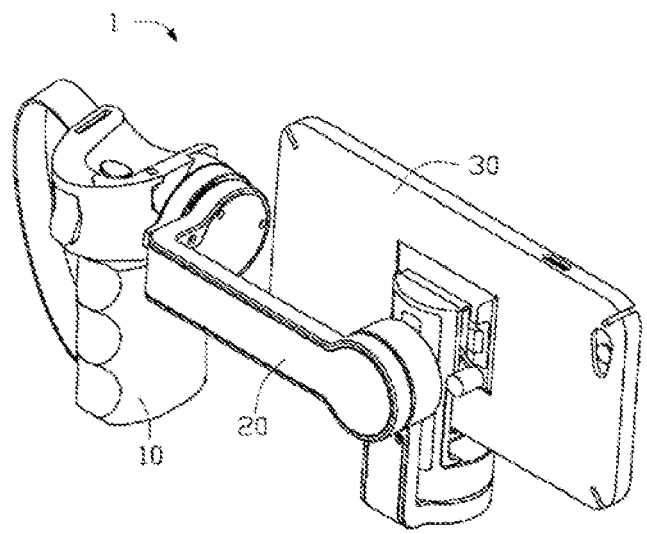
FIG. 1 is a perspective view of a handheld gimbal according to an example embodiment.

| | |
|---|---|
| Handheld gimbal | 1 |
| Handheld structure | 10 |
| Protective apparatus | 100 |
| Handheld body | 101 |
| Gripping structure | 102 |
| Anti-slippery member | 1020 |
| First connector assembly | 104 |
| Base | 1040 |
| Surrounding wall | 1041 |
| Assembling hole | 1042 |
| Connector | 1043 |
| First fastening member | 1044 |
| Opening | 1045 |
| Functioning member | 1046 |
| Functioning button | 106 |
| Battery bay | 108 |
| Gimbal body | 20 |
| Pitch-axis frame assembly | 21 |
| First motor | 210 |
| Positioning rod | 2100 |
| Second fastening member | 2102 |
| First rotating member | 211 |
| First supporting arm | 212 |
| Second supporting arm | 213 |
| First fixed base | 214 |
| Roll-axis frame assembly | 22 |
| Second motor | 220 |
| Third supporting arm | 221 |
| Fourth supporting arm | 222 |
| Second fixed base | 223 |

-continued

| | |
|---|---|
| Yaw-axis frame assembly | 23 |
| Third motor | 230 |
| Fifth supporting arm | 231 |
| Housing | 30 |
| First fitting member | 50 |
| Movable part | 51 |
| Operating part | 510 |
| Operating member | 5100 |
| Sleeve member | 5102 |
| Intermediate part | 512 |
| Assembling hole | 5120 |
| Abutting member | 513 |
| External threads | 5130 |
| Protruding member | 5132 |
| Fixed part | 52 |
| Fixing hole | 520 |
| Threaded through hole | 522 |
| Ball plunger assembling hole | 524 |
| Slidable member | 526 |
| Ball plunger | 54 |
| Second fitting member | 32 |
| Blocking member | 320 |
| Groove | 322 |
| Stopping member | 324 |
| Position-limiting hole | 326 |

Embodiments of the present disclosure will be explained in the following detailed descriptions in combination with the accompanying drawings.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

As used herein, when a first component (or element, member, part, piece) is referred to as "coupled," "mounted," "fixed," "secured" to or with a second component, it is intended that the first component may be directly coupled, mounted, fixed, or secured to or with the second component or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. When a first component is referred to as "disposed," "located," or "provided" on a second component, the first component may be directly disposed, located, or provided on the second component or may be indirectly disposed, located, or provided on the second component via an intermediate component. When a space is "defined by" a structure, the space is referred to as being at least partially surrounded, encircled, enclosed, walled, or fenced by the structure. The terms "perpendicular," "horizontal," "left," "right," and similar expressions used herein are merely intended for description.

According to various embodiments of the present disclosure, a handheld gimbal may be used with various portable electronic devices. For example, the disclosed handheld gimbal may be used in television, movie, reality show, sports photography, aerial photography, safety surveillance, etc. The disclosed handheld gimbal may have any suitable number of axis (axes) of rotations, such as two axes, three axes, or four axes of rotation. For the purpose of illustration, the following descriptions use a three-axis gimbal as an example of the handheld gimbal, and use cell phone as an example of the electronic device.

Embodiments of the present disclosure will be described below with reference to the accompanying drawings. Unless otherwise noted or unless there is a conflict, the following embodiments and various features of each embodiment are not mutually exclusive, and can be combined.

Referring to FIG. 1, a handheld gimbal 1 includes a handheld structure 10 and a gimbal body 20 fixedly coupled with the handheld structure 10. The gimbal body 20 is configured to support an electronic device (not shown). The electronic device may be rotatably coupled with the gimbal body 20, and can rotate around an axis of the gimbal body 20, such as a roll-axis. The electronic device may be disposed (or located, provided) in a housing 30. The housing 30 may be detachably coupled with the gimbal body 20, thereby enabling the electronic device to detachably couple with the gimbal body 20. In some embodiments, the handheld gimbal 1 includes a supporting member that is rotatably coupled with the gimbal body 20, or that is a part of the gimbal body 20. The supporting member may be configured to support the electronic device.

It is understood that the electronic device may be a camera, a cell phone, a portable electronic device (e.g., a tablet, an iPad), etc.

Figure 2:
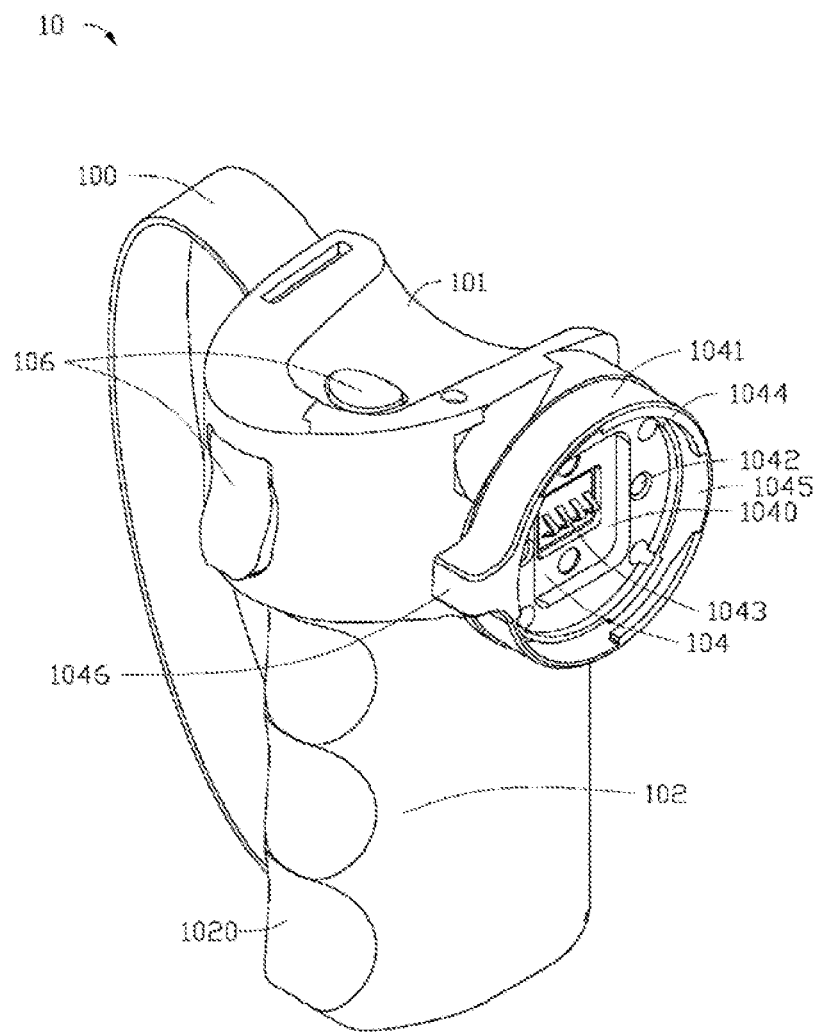
FIG. 2 is a perspective view of a handheld structure of the handheld gimbal of FIG. 1, according to an example embodiment.
Figure 3:
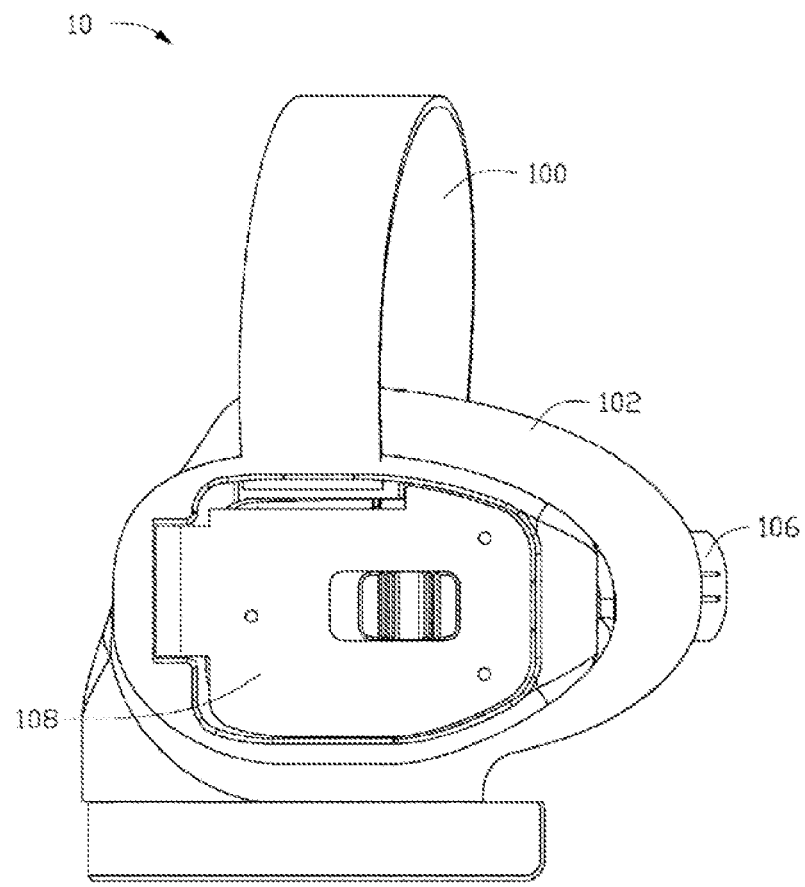
FIG. 3 is a top view of the handheld structure of FIG. 2, according to an example embodiment.
Figure 4:
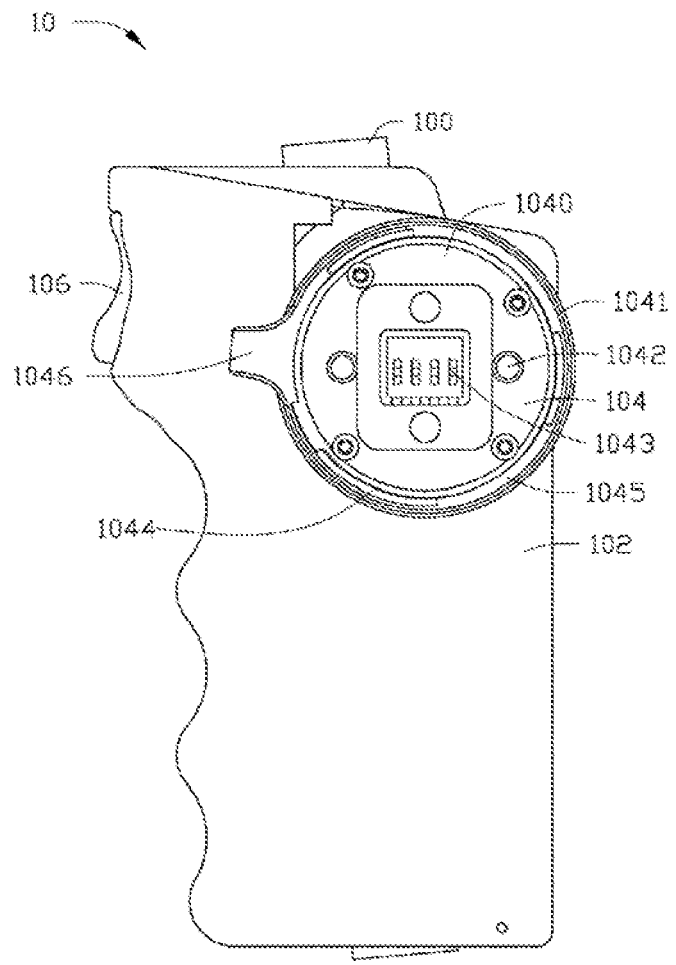
FIG. 4 is a side view of the handheld structure of FIG. 2, according to an example embodiment.

FIGS. 2-4 show the handheld structure 10 of the handheld gimbal 1. The handheld structure 10 includes a protective apparatus 100, a handheld body 101, a gripping structure 102, and a first connector assembly 104.

As shown in FIG. 2, in some embodiments, two opposing ends of the protective apparatus 100 are fixed to the handheld body 101. The portion of the protective apparatus 100 between the two opposing ends forms a handle, which may be worn on a hand wrist of a user. In some embodiments, the two opposing ends of the protective apparatus 100 are secured (or mounted, fixed, coupled) to an upper end and a lower end of the handheld body 101, respectively. The protective apparatus 100 may extend vertically along the longitudinal direction of the handheld body 101. In some embodiments, the two opposing ends of the protective apparatus 100 may be fixed (or mounted, secured, coupled) to any other suitable locations of the handheld body 101, such as a central or near central portion of the handheld body 101. In some embodiments, the protective apparatus 100 has a wrist strap configuration, with two opposing ends fixed to the handheld body 101 or the gripping structure 102, and the middle portion of the protective apparatus 100 forming a wrist strap that can be worn on a hand wrist of a user. In some embodiments, the wrist strap extends vertically along an extending direction (a direction in which the body of the gripping structure 102 extends longitudinally) of the gripping structure 102. In some embodiments, the wrist strap extends in another direction that is different from the extending direction of the gripping structure 102. For example, the wrist strap may extend along a horizontal direction that is substantially perpendicular to the extending direction of the gripping structure 102. In some embodiments, the protective apparatus 100 has a flexible wrist strap configuration, which may further improve the wearing comfort.

In some embodiments, as shown in FIG. 2, the handheld body 101 is provided with one or more functional buttons 106 (two are shown in FIG. 2 for illustration purpose). When a user wears the protective apparatus 100 on one hand, the user can operate the functional buttons 106 using the same hand (e.g., single hand operation). In some embodiments, the handheld body 101 may be provided with a controller (not shown) that may be disposed within the handheld body 101. The controller and the functional buttons 106 may be electrically connected. The controller may generate control commands or signals corresponding to and/or in response to input signals received from the functional buttons 106. The controller may send the control commands or signals to the gimbal body 20.

In some embodiments, the functional buttons 106 may include a power button that may control the battery of the handheld structure 10. In some embodiments, the functional buttons 106 may include an operation control button that may control the operation status of the handheld gimbal 1. In some embodiments, the functional buttons 106 may include other input devices, such as a toggle switch, a rotating switch, a sliding switch, a physical touchable key or a virtual touchable key on a touch screen, a control joystick, etc. In some embodiments, the functional buttons 106 is provided near the protective apparatus 100 to enable the user to operate the functional buttons 106 using a single hand while wearing the protective apparatus using the same hand.

In some embodiments, the functional buttons 106 may include buttons that control video recording, photographing, or playback functions provided by the electronic device supported by the gimbal body 20, such as a camera, a cell phone, a portable device (e.g., a tablet, an iPad), etc.

In some embodiments, the handheld body 101 may be powered by a power unit (e.g., a battery) that may be disposed inside the handheld body 101. The power unit may include a rechargeable battery fixedly provided inside the handheld body 101, and/or a non-rechargeable and replaceable battery. For example, the battery may be accessed for replacement through opening a battery bay 108 shown in FIG. 3.

In some embodiments, as shown in FIG. 2, the gripping structure 102 extends from a bottom portion of the handheld body 101 away from the handheld body 101. The gripping structure 102 may be provided with one or more anti-slippery members 1020. In some embodiments, the anti-slippery members 1020 are impressions on the gripping structure 102 for fitting fingers of a user for secure gripping.

In some embodiments, the first connector assembly 104 is disposed on a side of the handheld body 101. The first connector assembly 104 may be configured for electrically and mechanically coupling the gimbal body 20 to the handheld structure 10. In some embodiments, as shown in FIG. 3, the first connector assembly 104 is provided on a side of the handheld structure 10 that is opposite another side where the protective apparatus 100 is provided. In some embodiments, the first connector assembly 104 includes a base 1040 fixed to a side of the handheld body 101. The first connector assembly 104 may also include a surrounding wall 1041 protruding from the base 1040 and extending perpendicular to and away from the side of the handheld body 101. In some embodiments, the base 1040 has a substantially circular shape. In some embodiments, the surrounding wall 1041 forms a hollow cylindrical shape. The base 1040 may be provided with one or more assembling holes 1042 and a connector 1043 that is configured to provide electrical connections to the gimbal body 20 mounted on the first connector assembly 104. One or more first fastening members 1044 may be disposed along an inner circumference of the surrounding wall 1041 at a predetermined interval. An opening 1045 may exist between every two adjacent first fastening members 1044. In some embodiments, a functioning member 1046 is disposed on an outer side of the first connector assembly 104, which rotates when pressed by an external force, causing the surrounding wall 1041 to rotate.

In some embodiments, the gimbal body 20 is operably coupled with the first connector assembly 104. In some embodiments, the gimbal body 20 is a three-axis gimbal including three axes of rotation and corresponding rotating mechanisms. Each rotating mechanism may include a frame assembly. In some embodiments, the three frame assemblies include a pitch-axis frame assembly 21, a roll-axis frame assembly 22, and a yaw-axis frame assembly 23. In some embodiments, the gimbal body 20 is coupled with the first connector assembly 104 through one of the three axes. The axis through which the gimbal body 20 is coupled with the first connector assembly 104 may be substantially perpendicular to an extending direction of the gripping structure 102.

Figure 5:
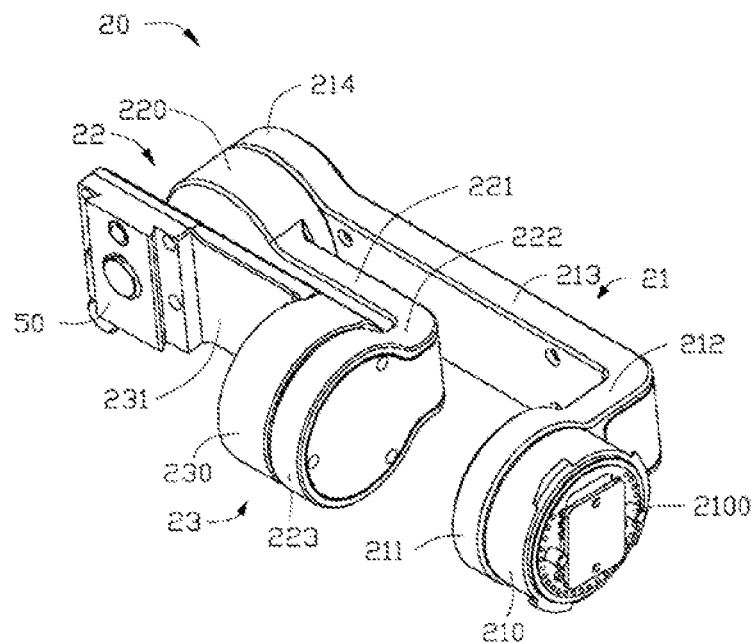
FIG. 5 is a perspective view of a gimbal body of the handheld gimbal of FIG. 1, according to an example embodiment.
Figure 6:
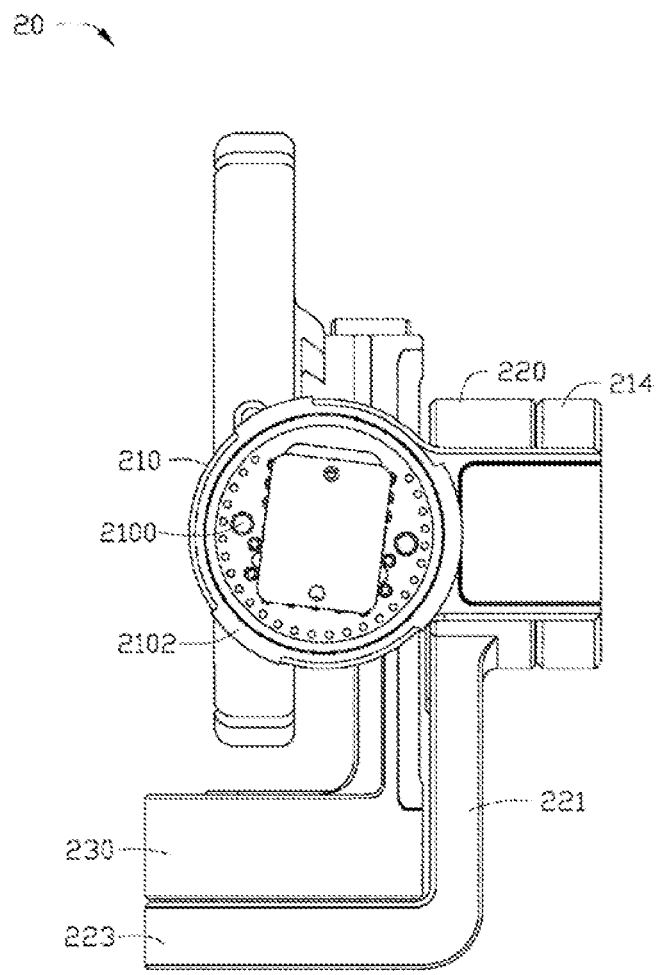
FIG. 6 is a side view of the gimbal body of FIG. 5, according to an example embodiment.

In the embodiments shown in FIGS. 5 and 6, the pitch-axis frame assembly 21 is fixed to the first connector assembly 104 of the handheld structure 10. The pitch-axis frame assembly 21 is configured to enable the electronic device carried by the gimbal body 20 to rotate around a pitch-axis relative to the handheld structure 10. In some embodiments, the pitch-axis frame assembly 21 includes a first motor 210, a first rotating member 211 that is operably coupled with the first motor 210, a first supporting arm 212 operably coupled with the first rotating member 211, a second supporting arm 213 operably coupled with the first supporting arm 212, and a first fixed base 214 operably coupled to an end of the second supporting arm 213 away from the first fixed base 214 and opposite another end of the second supporting arm 213. In some embodiments, the first rotating member 211 has a substantially cylindrical shape. In some embodiments, the first supporting arm 212 radially may extend from a side of an outer circumferential wall of the first rotating member 211. In some embodiments, the second supporting arm 213 may extend from an end of the first supporting arm 212 that is away from the first rotating member 211 in a direction away from the first motor 210. In some embodiments, the extending direction of the second supporting arm 213 is substantially parallel with an axis of rotation of the first rotating member 211. In some embodiments, the pitch-axis frame assembly 21 has a substantially L-shape.

In some embodiments, the roll-axis frame assembly 22 is operably coupled with an end of the pitch-axis frame assembly 21 that is away from the first rotating member 211. The roll-axis frame assembly 22 is configured to enable the electronic device to rotate around a roll-axis of the handheld structure 10. In some embodiments, the roll-axis frame assembly 22 includes a second motor 220 that is rotatably coupled with a first fixed base 214, a third supporting arm 221, a fourth supporting arm 222, and a second fixed base 223. In some embodiments, the second motor 220 has a substantially cylindrical shape. In some embodiments, the third supporting arm 221 extends radially from an outer circumferential wall of the second motor 220. In some embodiments, the fourth supporting arm 222 extends from an end of the third supporting member 221 that is away from the first fixed base 214 in a direction that is away from the first fixed base 214. In some embodiments, an extending direction of the fourth supporting arm 222 is substantially parallel with an axis of rotation of the second motor 220. In some embodiments, the roll-axis frame assembly 22 has a substantially L-shape. In some embodiments, the first motor 210 and the second motor 220 are provided on the same side of the second supporting arm 213. In some embodiments, a length of the third supporting arm 221 is smaller than a length of the second supporting arm 213. As a result, the second fixed base 223, the third motor 230, the first motor 210, and the first rotating member 211 do not interfere with one another.

In some embodiments, the yaw-axis frame assembly 23 is operably coupled with an end of the roll-axis frame assembly 22 that is away from another end where the first fixed base 214 is located. In some embodiments, the yaw-axis frame assembly 23 is configured to enable the electronic device to rotate around a yaw-axis relative to the handheld structure 10. In some embodiments, the yaw-axis frame assembly 23 also includes a third motor 230 that is rotatably coupled with the second fixed base 223. The yaw-axis frame assembly 23 may also include a fifth supporting arm 231. In some embodiments, the third motor 230 has a substantially cylindrical shape. In some embodiments, the fifth supporting arm 231 extends from a side of an outer wall of the third motor 230, along a direction that is substantially parallel with an axis of rotation of the third motor 230, away from the second fixed base 223. In some embodiments, the fifth supporting arm 231 is substantially parallel with the third supporting arm 221. In some embodiments, the yaw-axis frame assembly has a substantially L-shape. In some embodiments, a length of the fourth supporting arm 222 is relatively short, such that the fifth supporting arm 231 is close to the third supporting arm 221. In some embodiments, the third motor 230 and the first motor 210 are disposed on opposite sides with respect to the second fixed base 223. As a result, the yaw-axis frame assembly 23 and the pitch-axis frame assembly 21 do not interfere with one another. In some embodiments, the yaw-axis frame assembly 23 is provided within a space at least partially defined by the L-shape of the roll-axis frame assembly 22.

In some embodiments, the pitch-axis, roll-axis, and yaw-axis are three axes of rotation of the gimbal body 20. The pitch-axis and the roll-axis are perpendicular to one another. The roll-axis and the yaw-axis are perpendicular to one another. The pitch-axis and the yaw-axis may coincide with one another, cross one another at an angle other than 90°, or be perpendicular to one another. The electronic device may be mounted to an end of the fifth supporting arm 231 of the yaw-axis frame assembly 23 that is away from the second fixed base 223. When the roll-axis frame assembly 22 rotates relative to the pitch-axis frame assembly 21 until the third supporting arm 221 and the second supporting arm 213 are substantially parallel with one another, the axis of rotation of the third motor 230 becomes parallel with the fifth supporting arm 231, the third supporting arm 221, and the second supporting arm 213. As a result, an axis of rotation of the third motor 230 and an axis of rotation of the first motor 210 may be parallel with one another, and the pitch-axis may coincide with the yaw-axis, and the gimbal body 20 can be regarded as a two-axis gimbal, as illustrated in the state shown in FIG. 5.

When the roll-axis frame assembly 22 rotates relative to the pitch-axis frame assembly 21 until the third supporting arm 221 is substantially perpendicular to the second supporting arm 213, because an axis of rotation of the third motor 230 is parallel with the fifth supporting arm 231 and the third supporting arm 221, and because an axis of rotation of the first motor 210 is parallel with the second supporting arm 213, the axis of rotation of the third motor 230 becomes substantially perpendicular to the axis of rotation of the first motor 210. At this state, as shown in FIG. 1, the gimbal body 20 can be regarded as a three-axis gimbal.

In some embodiments, because the second motor 220 and the first motor 210 are disposed or located on the same side of the second supporting arm 213, and because a length of the third supporting arm 221 is smaller than a length of the second supporting arm 213, in the state shown in FIG. 5, the roll-axis frame assembly 22 and the yaw-axis frame assembly 23 are at least partially disposed or located in a space defined by (e.g., partially surrounded or fenced) the L-shape of the pitch-axis frame assembly 21, and the yaw-axis frame assembly 23 is at least partially disposed or located in a space defined by the L-shape of the roll-axis frame assembly 22. At this state, the gimbal body 20 is in a folded state, which makes it convenient for transportation or storage.

Referring to FIGS. 5 and 6, in some embodiments, the pitch-axis frame assembly 21 includes one or more positioning rods 2100 (two are shown in FIG. 6 for illustration purpose) and one or more second fastening members 2102. The one or more positioning rods 2100 correspond to the one or more assembling holes 1042. The one or more second fastening members 2102 of the pitch-axis frame assembly 21 correspond to the one or more first fastening members 1044 of the first connector assembly 104. When mounting the pitch-axis frame assembly 21 to the first connector assembly 104, a user may apply a force on the functioning member 1046 to cause the surrounding wall 1041 to rotate around an axis of rotation of the surrounding wall 1041. When the surrounding wall 1041 rotates to a predetermined position, the first motor 210 of the pitch-axis frame assembly 21 is placed into the hollow cylindrical shape defined by the surrounding wall 1041, thereby inserting the positioning rods 2100 into the assembling holes 1040. At this position, the one or more second fastening members 2102 may be aligned with one or more openings 1045 located between the first fastening members 1044. The user can then release the force applied to the functioning member 1046, which causes the surrounding wall 1041 to return to its initial position. The second fastening members 2102 of the of the pitch-axis frame assembly 21 may tightly couple with the corresponding first fastening members 1044 of the first connector assembly 104, thereby lockingly fix or mount the pitch-axis frame assembly 21 to the first connector assembly 104.

In some embodiments, the fifth supporting arm 231 is provided with a first fitting member 50 for mounting the electronic device. The first fitting member 50 may be configured to couple with a housing of the electronic device such that the electronic device may be mounted to the first fitting member 50.

Figure 7:
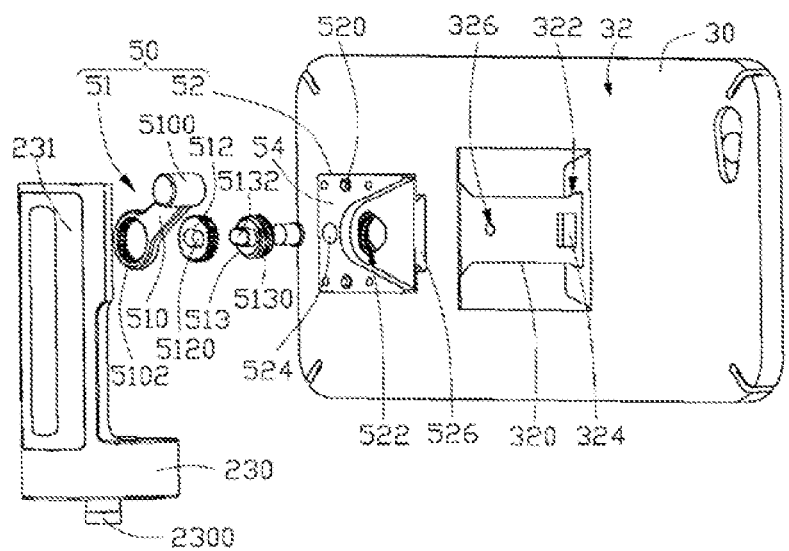
FIG. 7 is an exploded view of an assembly structure for coupling the gimbal body and an electronic device, according to an example embodiment.
Figure 8:
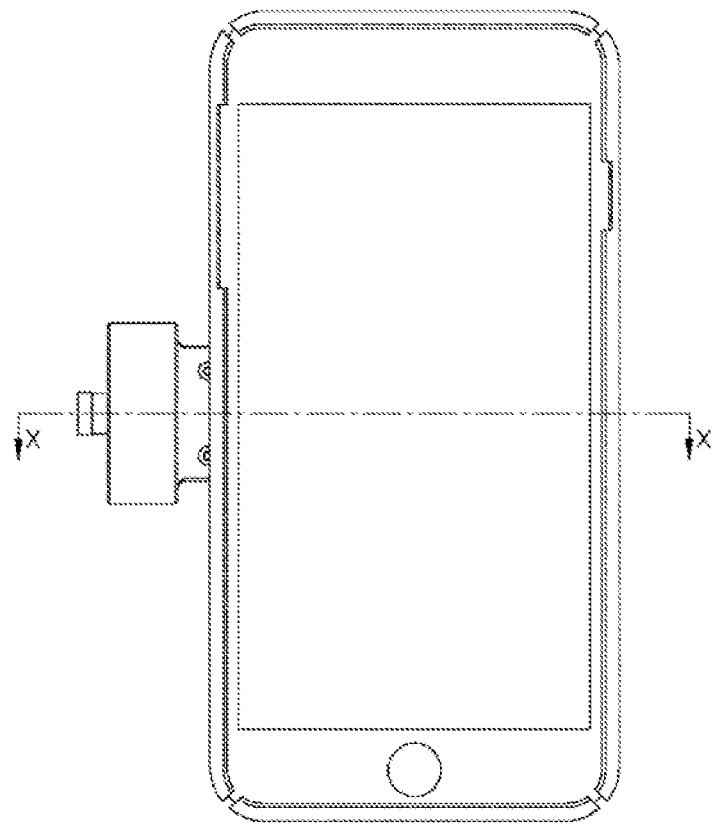
FIG. 8 is a front view of the electronic device and the gimbal body of FIG. 7 when the gimbal body and the electronic device are assembled, according to an example embodiment.
Figure 9:
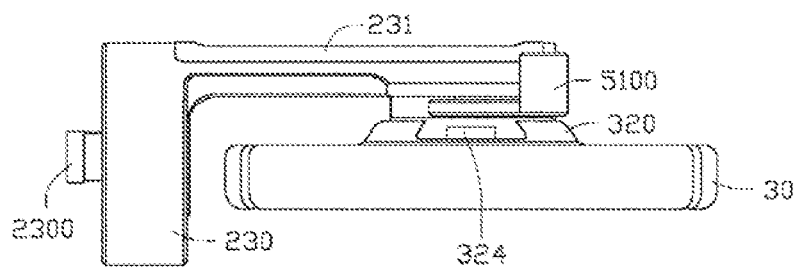
FIG. 9 is a top view of the gimbal body and the electronic device of FIG. 7, when the assembly structure is at an unlocked position, according to an example embodiment.
Figure 10:
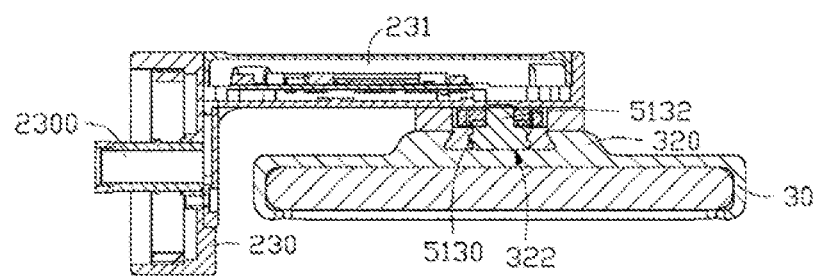
FIG. 10 is a cross-sectional view of the gimbal body and the electronic device at an unlocked position along the X-X line of FIG. 8, according to an example embodiment.
Figure 11:
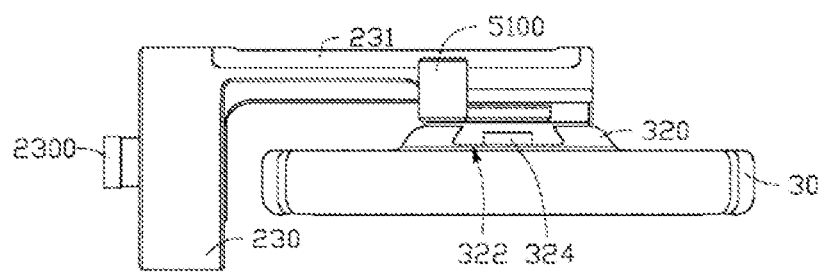
FIG. 11 is a side view of the gimbal body and the electronic device of FIG. 7, when the assembly structure is at a locked position, according to an example embodiment.
Figure 12:
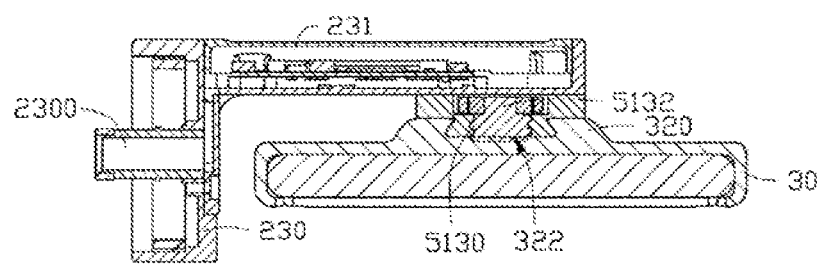
FIG. 12 is a cross-sectional view of the gimbal body and the electronic device at a locked position along the X-X line of FIG. 8, according to an example embodiment.

FIG. 7 shows an example exploded view of a fitting structure or assembly between the first fitting member 50 and the housing 30. The first fitting member 50 may be detachably fixed to a second fitting member 32 provided on the housing 30 through a quick release structure. In some embodiments, the first fitting member 50 includes a movable part 51 and a fixed part 52. In some embodiments, the fixed part 52 is fixedly connected to the fifth supporting arm 231. In some embodiments, the movable part 51 is disposed between the fifth supporting arm 231 and the fixed part 52. In some embodiments, the fixed part 52 is disposed at an end of the fifth supporting arm 231 that is away from the third motor 230.

In some embodiments, the movable part 51 includes an operating part 510, an intermediate part 512, and an abutting member 513. In some embodiments, the operating part 510 includes an operating member 5100 and a sleeve member 5102. In some embodiments, the operating member 5100 may be a protruding handle. When an external force is applied to the operating member 5100, the operating part 510 may rotate. In some embodiments, the sleeve member 5102 has a circular shape with a center hole. An inner wall of the circular shape at the center hole may include internal threads. In some embodiments, the intermediate part 512 may include external threads at an outer surface. The external threads of the intermediate part 512 may match with the internal threads of the sleeve member 5102 to couple the intermediate part 512 with the operating part 510 (e.g., the intermediate part 512 may be sleeve into the sleeve member 5102). In some embodiments, the intermediate part 512 includes an assembling hole 5120. The abutting member 513 may include external threads on an outer surface and a protruding member 5132 on a side that faces the intermediate part 512. The protruding member 5132 may have a shape that matches the assembling hole of the intermediate part 512, and may be accommodated in the assembling hole 5120 of the intermediate part 512, thereby enabling the abutting member 513 to rotate as the intermediate part 512 rotates.

In some embodiments, the fixed part 52 can be fixed to the fifth supporting arm 231 through one or more fixing holes 520. In some embodiments, the fixed part 52 may be fixed to the fifth supporting arm 231 through other fixing mechanisms that can fix part 52 to the fifth supporting arm 231, such as snap-fit connections. In some embodiments, the fixed part 52 includes threaded through hole 522, which may be coupled or matched with external threads 5130 of the abutting member 513, thereby positioning the abutting member 513 in the threaded through hole 522. In some embodiments, the fixed part 52 includes a slidable member 526 provided on a side that faces the second fitting member 32.

In some embodiments, the second fitting member 32 is fixed to a back side of the housing 30. In some embodiments, the second fitting member 32 includes two opposing blocking members 320. A groove 322 may be formed between the two blocking members 320. In some embodiments, when under an external force, the slidable member 526 of the fixed part 52 may slide into the groove 322 from an entry end of the groove 322. In some embodiments, a stopping member 324 is disposed at an exit end of the groove 322 to prevent the fixed part 52 from sliding out of the groove 322 at the exit end, when the slidable member 526 of the fixed part 52 slides in the groove 322. In some embodiments, the groove 322 and the slidable member 526 both have a swallowtail shape, which enables two lateral sides of the slidable member 526 to engage with the blocking members 320.

In some embodiments, the first fitting member 50 includes a ball plunger 54 mounted to the fixed part 52 through a ball plunger assembling hole 524 provided on the fixed part 52. In some embodiments, the groove 322 of the second fitting member 32 includes a position-limiting hole 326. When the slidable member 526 of the fixed part 52 slides to abut or resist against the stopping member 324, the ball plunger 54 may extend into the position-limiting hole 326, thereby limiting the position of the fixed part 52, which further causes a user to have feeling that the position has been limited.

During assembling, a user may insert a protruding member 5132 of the abutting member 513 of the movable part 51 into an assembling hole 5120 of the intermediate part 512. Then the user may couple the intermediate part 512 with the operating part 510 through engaging the external threads provided on the intermediate part 512 with the internal threads of the operating part 510, thereby completing the assembling process of the movable part 51. Next, the user may engage the movable part 51 with the fixed part 52 through engaging the external threads 5130 of the abutting member 513 with the threaded through hole 522. The user may also mount the ball plunger 54 to the fixed part 52 through the ball plunger assembling hole 524 provided on the fixed part 52. As such, the user completes the assembly of the first fitting member 50. Finally, the user may couple the first fitting member 50 to the fifth supporting arm 231 through the fixing hole 520 provided on the fixed part 52.

FIGS. 8-12 show the first fitting member 50 and the second fitting member 32 in locked and unlocked states. When in the locked state, the external threads 5130 of the abutting member 513 do not protrude beyond or out of the threaded through hole 522 of the fixed part 52. In some embodiments, the first fitting member 50 may slide in the groove 322. When a user operates the operating member 5100 of the operating part 510, the operating part 510 rotates around a central axis of the sleeve member 5102, thereby causing the intermediate part 512 and the abutting member 513 to rotate with the rotation of the operating part 510. As a result, the external threads 5130 of the abutting member 513 may move into the threaded through hole 522 of the fixed part toward the groove 322, and may protrude out of the threaded through hole 522 to abut against a bottom surface of the groove 322. Correspondingly, a side of the slidable member 526 of the fixed part 52 is resisted or blocked by the blocking member 320, thereby restraining the fixed part 52 from sliding in the groove 322 (i.e., the fixed part 52 is at a locked position). Conversely, in some embodiments, when the fixed part 52 is at a locked position, and when the operating member 5100 of the operating part 510 is operated in an opposite direction, the operating part 510 rotates around the sleeve member 5102, thereby causing the intermediate part 512 and the abutting member 513 to rotate with the rotation of the operating part 510, which further causes external threads 5130 of the abutting member 513 to axially move along the threaded through hole 522 away from the groove 322. As a result of this movement, the external threads 5130 of the abutting member 513 retract into the threaded through hole 522 away from the button surface of the groove 322 (such that the abutting member 513 does not resist against the bottom surface of the groove 322). Accordingly, a side of the slidable member 526 of the fixed part 52 is no longer resisted by the blocking member 320. The slidable member 526 becomes free to slide in the groove 322, placing the fixed part 52 at the locked position.

In some embodiments, the first connector assembly 104 of the handheld structure 10 and the pitch-axis frame assembly 21 of the gimbal body 20 may be coupled through other fastening mechanisms, such as bolts, snap-fit structures, shape matching, screws, etc.

In some embodiments, the coupling between the gimbal body 20 and the handheld structure 10 is not limited to the pitch-axis frame assembly 21. The coupling may use other axes, such as the yaw-axis frame assembly 23, such that the electronic device can be mounted to the pitch-axis frame assembly 21.

In some embodiments, the coupling between the intermediate part 512 and the operating part 510 is not limited to matching threads. The coupling can include other fastening mechanisms, such as snap-fit structures, shape matching, etc. The coupling between the intermediate part 512 and the abutting member 513 is not limited to the matching shapes shown in FIG. 7. Other coupling mechanism may also be used, as long as the abutting member 513 can rotate as the intermediate part 512 and the operating part 510 rotate. In some embodiments, the intermediate part 512 may be omitted, and the abutting member 513 and the operating part 510 may be securely fixed together such that the abutting member 513 can rotate together with the operating part 510. In some embodiments, the abutting member 513 and the operating part 510 may be a single integral piece.

In some embodiments, the housing 30 is fixed to the gimbal body 20. When the handheld gimbal 1 is in use, the user can place the electronic device in the housing 30. When the handheld gimbal 1 is not in use, the user can take the electronic device out of the housing 30. In some embodiments, the housing is not limited to the shape shown in the drawings. In some embodiments, the housing 30 may be replaced by a bracket structure having adjustable length and width to accommodate electronic devices of various shapes.

In some embodiments, the coupling mechanism between the gimbal body 20 and the electronic device is not limited to the structure and configuration shown in the drawings. Any other suitable quick-release structure or configuration can be used, as long as the electronic device can be quickly locked onto the gimbal body 20, and quickly released from the gimbal body 20.

In the embodiments shown in the drawings, the gimbal body 20 is operably coupled with a side of the gripping structure 102. Compared to placing the gimbal body 20 on top of the gripping structure 102 or at the front side of the gripping structure 102, placing the gimbal body 20 on a side of the gripping structure 102 can avoid the top-heavy feeling when used by a user. Placing the gimbal body 20 on a side of the gripping structure 102 also makes it convenient to operate, or to change left and right hands. This configuration also makes the single-hand operation of the handheld gimbal 1 relatively easy.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A handheld gimbal for supporting an electronic device, the handheld gimbal comprising:
   a handheld structure including:
      a handheld body having at least one functional button at a top portion of the handheld body; and
      a gripping structure extending from a bottom portion of the handheld body away from the top portion of the handheld body; and
   a gimbal body operably coupled with a lateral side of the top portion of the handheld body at one end and configured to support the electronic device at another end.

2. The handheld gimbal of claim 1, wherein the gimbal body is a three-axis gimbal body having three axes of rotation, and the handheld structure is operably coupled with one of the three axes.

3. The handheld gimbal of claim 2,
   wherein the three axes comprise a pitch-axis, a roll-axis, and a yaw-axis, and
   wherein the handheld structure is operably coupled with the pitch-axis.

4. The handheld gimbal of claim 2, wherein an axis of the three axes of the gimbal body that is operably coupled with the handheld structure is substantially perpendicular to an extending direction in which a handle of the gripping structure extends.

5. The handheld gimbal of claim 1, wherein the gimbal body comprises a pitch-axis frame assembly that is operably coupled with the handheld structure, a yaw-axis frame assembly that is configured to support an electronic device, and a roll-axis frame assembly that operably couples the pitch-axis frame assembly and the yaw-axis frame assembly.

6. The handheld gimbal of claim 5, wherein the roll-axis frame assembly has an L-shape, and the yaw-axis frame assembly is disposed in a space defined by the L-shape.

7. The handheld gimbal of claim 6, wherein the pitch-axis frame assembly has an L-shape, and when the handheld gimbal is in a folded state, a rotating axis of the yaw-axis frame assembly is parallel with a rotating axis of the roll-axis frame assembly, and at least part of the yaw-axis frame assembly and at least part of the roll-axis frame assembly are disposed in the space defined by the L-shape of the pitch-axis frame assembly.

8. The handheld gimbal of claim 1, wherein the gimbal body comprises a first fitting member fixed to the gimbal body, the first fitting member being detachably fixed to a housing configured to mount an electronic device.

9. The handheld gimbal of claim 8, wherein the housing comprises a second fitting member mounted on a back side of the housing, the first fitting member and the second fitting member being detachably fixed to one another through a quick release structure.

10. The handheld gimbal of claim 9,
   wherein the first fitting member comprises a fixed part that is fixed to the gimbal body and a movable part disposed between the gimbal body and the fixed part, wherein the movable part is movable to change a position of the fixed part on the back side of the housing between a locked position and an unlocked position.

11. The handheld gimbal of claim 10, wherein the second fitting member comprises a blocking member disposed on the bade side of the housing and protruding from the back side of the housing, the blocking member and the back side of the housing form a groove, and the fixed part is slidable in the groove.

12. The handheld gimbal of claim 11, wherein at the locked position, the fixed part abuts against the blocking member, which restrains the fixed part from sliding in the groove, and at the unlocked position, the fixed part is slidable in the groove.

13. The handheld gimbal of claim 10, wherein
the movable part comprises an operating part and an abutting member fixedly matched with the operating part,
the operating part is rotatable under a force to cause the abutting member to rotate,
the abutting member comprises external threads on an outer side of the abutting member,
the fixed part comprises a corresponding threaded through hole, and
the abutting member is rotatable to cause the external threads on the outer side of the abutting member to axially move into the threaded through hole.

14. The handheld gimbal of claim 13,
wherein at the unlocked position, the external threads do not protrude beyond a side of the fixed part facing the housing, and
wherein at the locked position, the external threads protrude beyond the side of the fixed part facing the housing.

15. The handheld gimbal of claim 13,
wherein the movable part comprises an intermediate part disposed between the operating part and the abutting member, the intermediate part configured to transmit a rotation force from the operating part to the abutting member.

16. The handheld gimbal of claim 15,
wherein the operating part comprises an operating member and a sleeve member, the intermediate part is sleeved in the sleeve member and is rotatable as the operating part rotates.

17. The handheld gimbal of claim 16, wherein the intermediate part and the abutting member have matching shapes, which enable the abutting member to rotate as the intermediate part rotates.

18. The handheld gimbal of claim 17, wherein the intermediate part comprises an assembling hole, and the abutting member comprises a protruding member on a side of the abutting member that faces the intermediate part, the protruding member having a shape that matches the assembling hole such that the protruding member is at least partially disposed in the assembling hole.

19. The handheld gimbal of claim 11, wherein the second fitting member comprises a stopping member, the stopping member being configured to stop the fixed part from sliding out of the groove from an end of the groove opposite a slide-in end of the groove.

20. The handheld gimbal of claim 10, wherein the fixed part comprises a ball plunger mounted thereon, the ball plunger is configured to extend into a position-limiting hole in the housing when the fixed part is at the locked position, thereby limiting the position of the fixed part.

21. The handheld gimbal of claim 1,
wherein the handheld body comprises a protective apparatus wearable on a hand,
wherein two opposing ends of the protective apparatus are fixed to the handheld body or the gripping structure, and
wherein the protective apparatus extends around the handheld body or the gripping structure, and a direction of extension is different from an extending direction of the gripping structure.

22. The handheld gimbal of claim 21, wherein the protective apparatus is a wrist strap having two ends fixed to the handheld body.

* * * * *